June 9, 1925.  1,540,979
O. T. BLOOM
MACHINE FOR TESTING JELLY STRENGTH OF GLUES, GELATINES, AND THE LIKE
Filed April 11, 1923  3 Sheets-Sheet 2
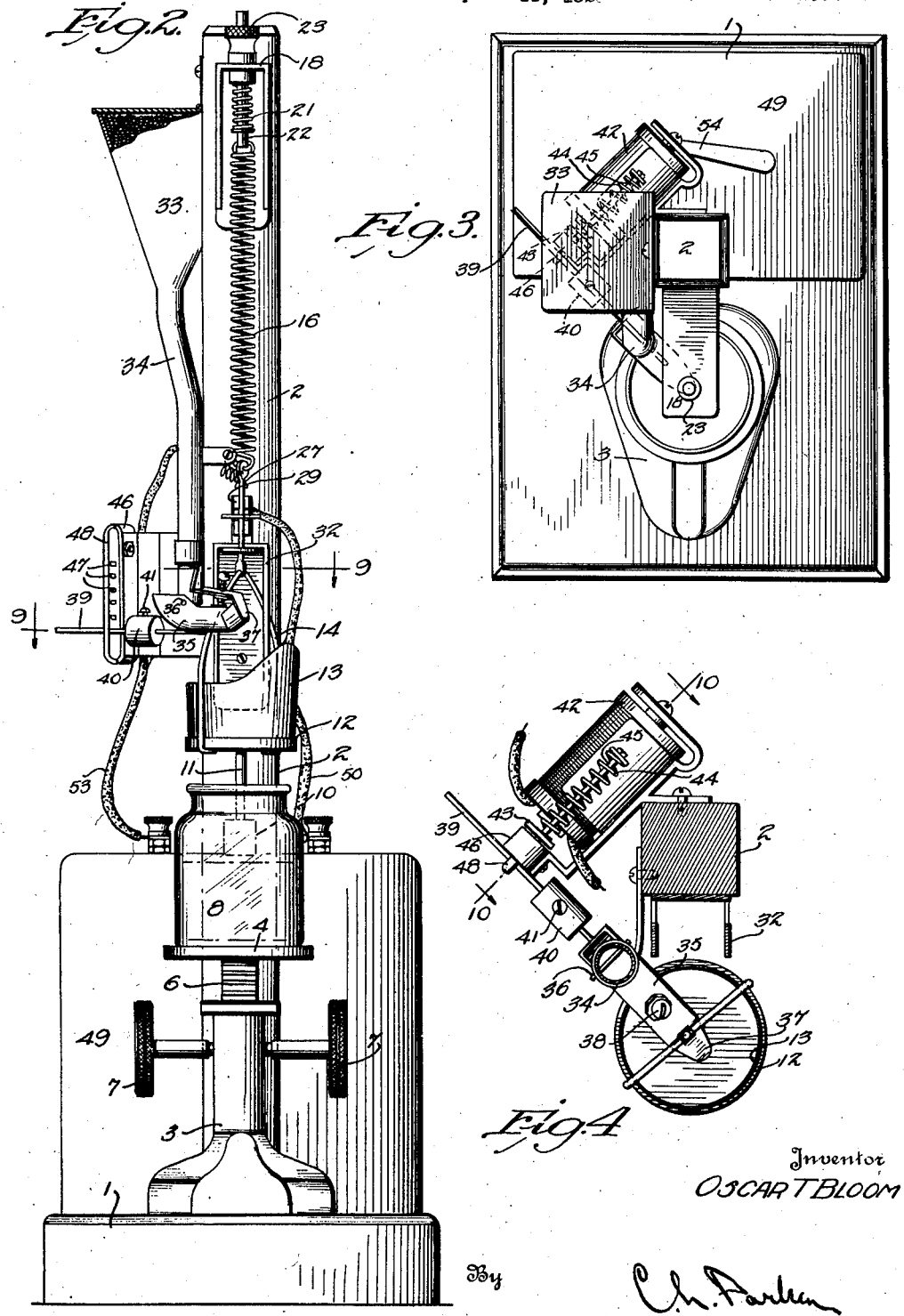
Inventor
OSCAR T BLOOM June 9, 1925.

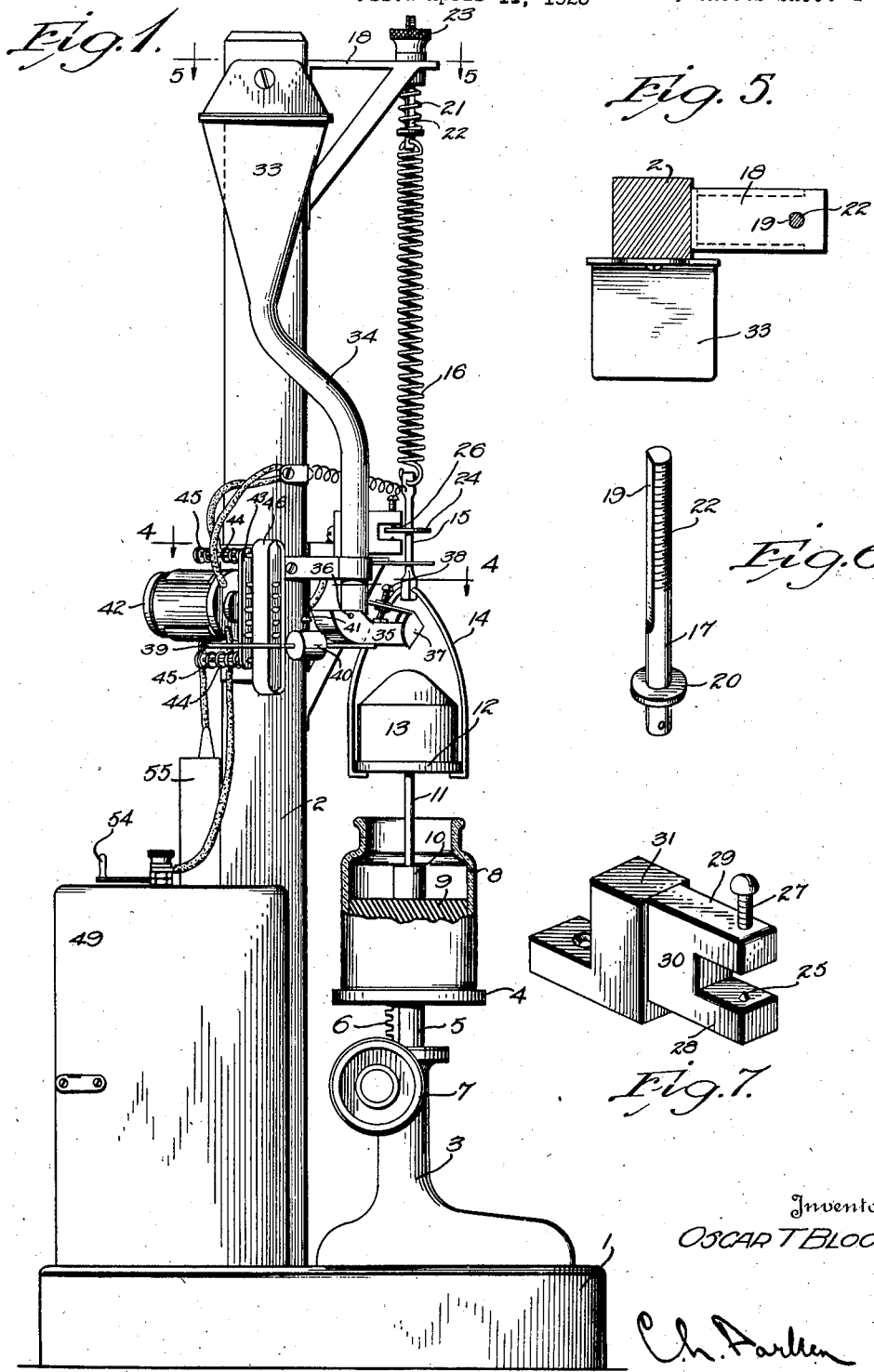

O. T. BLOOM 1,540,979

MACHINE FOR TESTING JELLY STRENGTH OF GLUES, GELATINES, AND THE LIKE

Filed April 11, 1923    3 Sheets-Sheet 3

Inventor
OSCAR T BLOOM

By C. h. Parker
Attorney

Patented June 9, 1925.

1,540,979

UNITED STATES PATENT OFFICE.

OSCAR T. BLOOM, OF CHICAGO, ILLINOIS, ASSIGNOR TO SWIFT & COMPANY, OF CHICAGO, ILLINOIS, A CORPORATION OF ILLINOIS.

MACHINE FOR TESTING JELLY STRENGTH OF GLUES, GELATINS, AND THE LIKE.

Application filed April 11, 1923. Serial No. 631,432.

*To all whom it may concern:*

Be it known that I, OSCAR T. BLOOM, a citizen of the United States, residing at Chicago, in the county of Cook and State of Illinois, have invented certain new and useful Improvements in Machines for Testing Jelly Strength of Glues, Gelatins, and the like, of which the following is a specification.

This invention relates to machines for testing the jelly strength of glues, gelatins, and the like.

The machines heretofore employed for testing the jelly strength of glues, gelatins and the like have been open to several objections, the principal one of which is that they are not reproducible. This has led to varying sets of standards of mass, length and time and the instruments have been employed merely in a comparative way.

In the present invention, I provide a machine in which a plunger is lowered into the gelatin or other material a predetermined distance within certain time limits, together with means for varying the force applied, which force may be measured to determine the jelly strength.

By means of such a machine, a uniform measurement of jelly strength may be determined and a machine may be reproduced to obtain the desired testing under precisely the same conditions used in previous tests for the purpose of obtaining accurate measurements of strength.

In the accompanying drawings, I have shown one embodiment of the invention. In this showing:

Figure 1 is a side elevation of the machine,

Figure 2 is a front elevation,

Figure 3 is a plan view,

Figure 4 is a transverse horizontal sectional view on line 4—4 of Figure 1,

Figure 5 is a similar view on line 5—5 of Figure 1,

Figure 6 is a detail view of an adjusting screw,

Figure 7 is a perspective view of a pair of spaced contacts.

Figure 8:
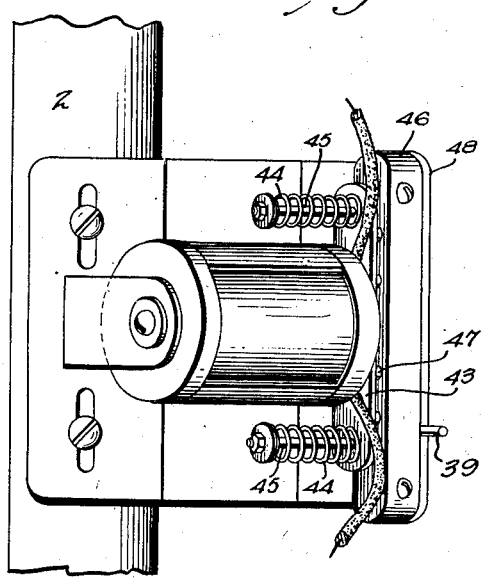
Figure 8 is a side elevation of an electromagnet forming a part of the control mechanism.
Figure 10:
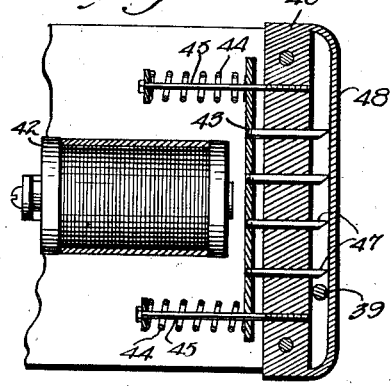
Figure 10 is a detail sectional view on line 10—10 of Figure 4, and, Figure 11 is a diagrammatic view of an electric circuit.
Figure 9:
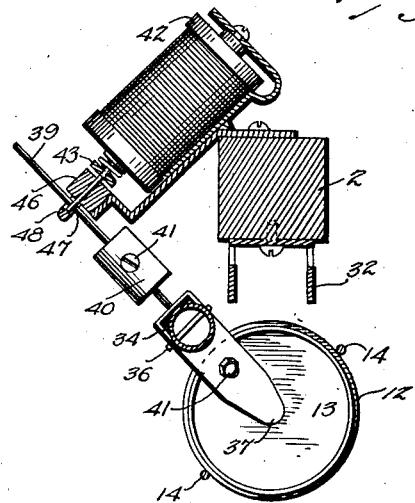
Figure 9 is a horizontal sectional view on line 9—9 of Figure 2.
Figure 11:

Referring to the drawings, the reference numeral 1 designates generally the base of the machine which may be supported on a suitable foundation, such as the floor of a building. A pillar or standard 2 extends upwardly from the base. A platform support 3 is also arranged on the base and this support is adapted to receive an adjustable platform 4. As shown, the adjustable platform is provided with a depending arm 5 which is received in the support. This arm is provided with rack teeth 6, adapted to mesh with a pinion (not shown) in the support. The pinion is mounted on a shaft (not shown) which is provided with a hand wheel 7. A test bottle 8 is supported on the platform and is adapted to receive the material 9 to be tested.

A plunger 10 is mounted to reciprocate over the test bottle. As shown, this plunger is carried by a rod 11 secured to the base of a pan 12. A shot receiver is adapted to be mounted on this pan. Arms 14 extend upwardly from the pan and are secured to a rod 15. This rod is in turn connected to a spring 16. The upper end of the spring is connected to an adjusting screw 17 which extends through a suitable opening in a bracket 18 carried at the top of the standard 2. As shown, the opening in the bracket is flattened at one point and the screw 17 is provided with a flattened portion 19 (see Figures 5 and 6). Adjacent the bottom of the screw, there is provided a collar 20 and a tension spring 21 is arranged between this collar and the bottom of the bracket. The screw is provided with a threaded portion 22 and is adapted to receive an adjusting nut 23.

The rod 15 carries a contact disk 24 preferably formed of silver. This disk is adapted to reciprocate between a pair of spaced contacts 25 and 26. The latter contact is adjustable by means of an adjusting screw 27. The contact points are arranged on a pair of spaced arms 28 and 29 carried by a block 30. This block is in turn carried by a block 31 formed of wood fibre or other suitable insulating material and is secured to a bracket 32, carried by the standard 2. The reciprocation of the plunger and its associated parts is caused by the deposition of suitable weights in the form of shots in the shot receiver 13. A hopper 33 is arranged at any convenient point elevated above the shot receiver and is provided with a delivery chute 34, the outlet end of which is arranged adjacent the shot receiver. The outlet end is normally closed by a clamshell valve. As shown, the valve consists of a pivoted member 35, suitably supported on a pivot 36, carried by the chute. The outer end of this pivoted member is normally closed by a plate 37, supported by an adjusting screw 38. An arm 39 is secured to the pivoted member and this arm is provided with a weight 40 to normally retain the pivoted member in closed position. The weight is provided with a set screw 41 to retain it in an adjusted position.

An electro-magnet 42 is arranged adjacent the arm 39. A plate 43 is arranged in front of this magnet and is adapted to be attracted thereby when the magnet is energized. This plate is normally held spaced from the magnet by suitable springs 44, mounted on rods 45. These rods are carried by a guide 46. The guide is provided with a plurality of transverse openings adapted to receive dogs 47 carried by the plate 43. A rod 48 is spaced from the guide 46 and the valve rod 39 is arranged between these two members.

The magnet is connected to a suitable source of current 49 by a lead wire 50. From the magnet, the current flows through a lead wire 51 to a spring 52. This spring is connected to the rod 15, delivering current to the disk 24. From the disk, the current passes through one of the contacts 25 or 26, and the block 30 to a lead wire 53, which is in turn connected to the source of current. A suitable switch 54 may be arranged in this wire. A condenser 55 may be shunted across the circuit through the provision of lead wires 56 and 57, one of which is connected to the source of current and the other to the spring 52.

The operation of the device is as follows:
The space between the contact points 25 and 26 is adjusted when the machine is installed. With the current cut off and the disk 24 contacting with the lower contact 25, the screw 27 is adjusted until the distance between the contact points is exactly determined. This determines the depth of plunge of the plunger into the contents of the test bottle. Adjustment is then made of the disk 24 against the lower contact 25 until the disk is in the lightest possible engagement with the contact. When this point is reached, sparking will occur between the disk and the contact and a make and break vibration will be set up in the plate 43. The machine is then adjusted for operation and may be used for some period of time without further attention to these parts. However, in the use of the machine, it is advisable to make readjustments occasionally. The glue, gelatin, and similar material prepared in the usual way is placed in the test bottle 8 and chilled to the test temperature for the desired length of time. The bottle is placed on the platform 4 and raised by means of the rack and pinion until the upper level of the material is in contact with the bottom of the plunger 10. The plunger is raised until the disk 24 is in light electrical contact with the upper contact point. The shot receiver 13 is then quickly placed on the pan 12 and lever 39 is raised to a predetermined position on one of the dogs 47. The height to which the lever is raised regulates the velocity of the flow of shot. For weak jellies, one of the lower dogs is used and for strong jellies, one of the upper dogs is employed. The dog selected should be set as to keep the flow of shot within a prescribed time limit of from two to five seconds.

The raising of the lever 39 opens the clamshell spout closer and starts the flow of shot, depressing the plunger 10 into the jelly until the contact is made between the disk 24 and the lower contact 25. This closes the circuit and energizes the magnet 42. The soft iron member 43 is then moved toward the magnet, withdrawing the dog 47 that is supporting the lever 39. The weight 40 causes the lever to fall and immediately cuts off the flow of shot.

The weight of the shot delivered to the shot receiver plus the weight of the shot receiver itself is the weight required to move the plunger through the prescribed distance against the resistance of the jelly and measures the jelly strength. For glues and gelatins, the distance is 4 millimeters.

It is to be understood that the form of the invention herewith shown and described is to be taken as a preferred example of the same, and that various changes in the shape, size, and arrangement of parts may be resorted to without departing from the spirit of the invention or the scope of the subjoined claims.

I claim:

1. In a machine for testing the jelly strength of materials, a material penetrating member reciprocable a predetermined distance through the material being tested and initially contacting with the surface thereof, means for progressively delivering weights to said member to move it through its predetermined distance, and means controlled by the movement of said member for suspending the delivery of weights thereto when it has completed its movement.

2. In a machine for testing the jelly strength of materials, a material penetrating member movable a predetermined distance through the material being tested and initially contacting with the surface of the material, a receiver carried by said member, means for progressively delivering weights to said receiver to move said member, a valve controlling said delivering means, and means actuated by said member at the limit of its predetermined movement to close said valve.

3. In a machine for testing the jelly strength of materials, a material penetrating member movable a predetermined distance through the material being tested and initially contacting with the surface thereof, a receiver carried by said member, means for progressively delivering weights to said receiver to move said member, a valve controlling said delivery means, and electrically controlled means for closing said valve and adapted to be actuated by said member at the limit of its predetermined movement.

4. A machine for testing the jelly strength of materials comprising a reciprocating plunger, a receiver carried by said plunger, means for delivering weights to said receiver to actuate said plunger, a valve arranged in said delivery means, a pair of spaced contacts arranged adjacent said plunger, and electrically controlled means for actuating said valve, said means being adapted to close said valve when the plunger engages one of said contacts.

5. In a device of the character described, a movable member, a support for the material to be tested, said support being arranged adjacent said movable member to permit said member to penetrate the material when it is moved, a receiver carried by said movable member, means for delivering weights to said receiver to actuate said movable member, a closure for said delivery means, and means actuated by the movement of said movable member for operating said closure.

6. In a device of the character described, a reciprocating plunger, a shot receiver carried by said plunger, a hopper arranged above said shot receiver and adapted to deliver shot thereto, a valve arranged at the bottom of said hopper, a contact carried by said plunger, a second contact arranged in the path of said plunger, an electromagnet connected to said second contact, and adapted to be energized when said contacts are in engagement, and valve closing means operated by said electro-magnet.

7. In a machine for testing the jelly strength of materials, a movable member adapted to penetrate a predetermined distance into the material being tested and initially contacting with the surface of the material, means for continuously increasing the penetrating force of said member during its penetrating movement, and means for rendering said last named means inoperative when the predetermined penetration of said member has been completed.

In testimony whereof, I affix my signature in presence of two witnesses.

OSCAR T. BLOOM.

Witnesses:
PAUL L. HOLDEN,
CONNOR B. SHAW.